United States Patent

Cowx et al.

[11] Patent Number: 5,654,976
[45] Date of Patent: Aug. 5, 1997

[54] METHOD FOR MELTING FERROUS SCRAP METAL AND CHROMITE IN A SUBMERGED ARC FURNACE TO PRODUCE A CHROMIUM CONTAINING IRON

[75] Inventors: Peter Cowx; Hjalte Rognsaa, both of Oslo, Norway

[73] Assignee: Elkem Technology a/s, Norway

[21] Appl. No.: 423,771

[22] Filed: Apr. 18, 1995

[51] Int. Cl.⁶ .................................................. F27D 3/04
[52] U.S. Cl. ......................... 373/79; 373/80; 75/10.42; 75/10.63
[58] Field of Search ......................... 373/2, 9, 42, 77, 373/79, 80, 82, 84; 75/10.42, 10.43, 555, 559, 10.63, 10.19

[56] References Cited

U.S. PATENT DOCUMENTS

| | | | |
|---|---|---|---|
| 3,385,494 | 5/1968 | Themelis et al. | 75/10.5 |
| 4,252,559 | 2/1981 | Allain | 75/10.61 |
| 4,971,623 | 11/1990 | Wilford | 75/10.6 |

FOREIGN PATENT DOCUMENTS 0033937  9/1978  Japan.

*Primary Examiner*—Tu B. Hoang
*Attorney, Agent, or Firm*—Bierman, Muserlian and Lucas

[57] ABSTRACT

The process feeds a mixture of scrap metal, chromite, flux materials, carbonaceous material and wood chips to a submerged arc furnace to make a base iron suitable for iron and steel purposes. The mixture contains about 1–60% chromite, about 1 to 20% flux materials, about 5 to 35% carbonaceous material, about 0–10% wood chips, all based on the weight of scrap in the mixture. By maintaining the charge in the furnace, good energy efficiencies are obtained.

19 Claims, 1 Drawing Sheet

SUBMERGED ARC FURNACE

SUBMERGED ARC FURNACE

METHOD FOR MELTING FERROUS SCRAP METAL AND CHROMITE IN A SUBMERGED ARC FURNACE TO PRODUCE A CHROMIUM CONTAINING IRON

BACKGROUND OF THE INVENTION

1. Field of the Invention

This invention relates to the continuous melting of ferrous scrap metal and chromite in a submerged arc furnace to obtain a chromium containing iron suitable for the production of stainless steel, alloy steel or alloy cast iron.

2. Description of the Prior Art

The use of electric furnaces for melting scrap and producing iron is known. U.S. Pat. Nos. 3,665,085 issued May 23, 1972 and 4,423,514 issued Dec. 27, 1983 both teach a continuous process for melting scrap iron in an electric arc furnace. In both the '085 and '514 patents, the electrode is positioned above the molten material in the furnace and the charge to the furnace is scrap metal only. U.S. Pat. No. 4,119,454 issued Oct. 10, 1978 also teaches the use of an electric arc furnace for melting scrap. However, the electrode in the '454 patent is positioned in the molten material. In all three U.S. patents scrap metal is the only charge to the furnace.

Submerged arc furnaces are conventionally used for the manufacture of ferroalloys, phosphorus, silicon metal, calcium carbide and pig iron, and for the production of matte of copper, nickel and the platinum group elements. Typically, such submerged arc furnaces use either self-baking Søderberg electrodes or prebaked electrodes. Submerged arc furnaces have been used in the past to produce silvery pig iron (iron containing typically 10–20% silicon) using a high percentage of scrap charged to the furnace.

SUMMARY OF THE INVENTION

It has now been discovered that a submerged arc furnace can be used to process ferrous scrap and chromium containing material to produce a chromium containing iron suitable for iron and steel purposes. It has been found that ferrous scrap and chromium containing material can be charged to the furnace with a minimal amount of wood chips without bridging or arcing instabilities. Nickel units in the form of Ni, FeNi, NiO or other nickel containing materials may also be charged to the furnace to produce a nickel and chromium containing iron. Furthermore, contaminants can be controlled in a number of ways. Contaminants come from the raw materials and in order to produce a commercially viable process, they must be controlled. Using a submerged am furnace, the contaminants are controlled by one or more of the following means (1) proper pre-selection of the charge to the furnace; (2) use of slag in the furnace; and (3) treatment of the molten metal as tapped from the furnace. The produced chromium containing iron can be processed into stainless steel by known processes, such as for example argon oxygen decarburization (AOD).

DESCRIPTION OF THE PREFERRED EMBODIMENTS

Figure 1:
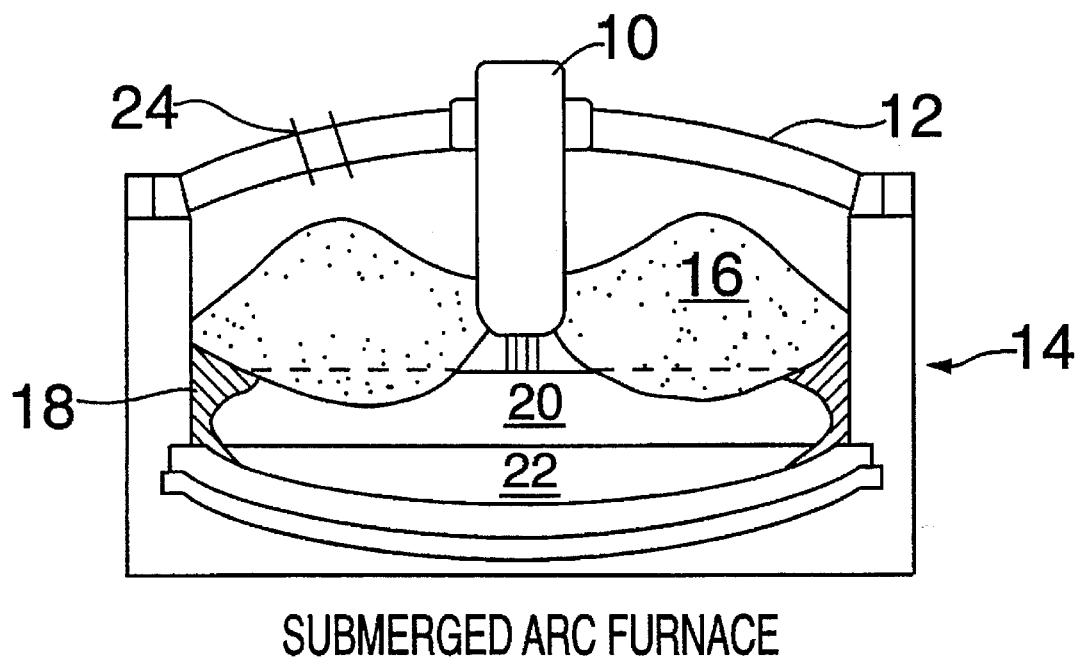
FIG. 1 illustrates a submerged arc furnace operated in accordance with the present invention.

Broadly, the process of the present invention entails a method for continuously converting scrap metal and/or direct reduced iron ore (DRI) and chromium containing materials into a chromium containing iron in a submerged arc furnace, said furnace having one or more electrodes positioned immediately above the molten layer in said furnace, or immersed into a slag layer, the improvement comprising:

(a) feeding in order to charge said furnace a mixture with composition subject to the composition of feed components and subject to the downstream iron or steel making process requirements, typically about 40% by weight of scrap of chromite, about 25% by weight of scrap of carbonaceous material, about 5% dry weight of scrap of one or more flux materials and a portion of wood chips to accommodate the type of scrap being used and to accomplish arc stability and easy movement of charge within the furnace, and remainder of ferrous scrap, wherein said scrap may comprise 70–99% and typically about 95% by weight iron.

(b) maintaining a layer of charge of said mixture above said molten layer or said slag layer in said furnace such that said electrode or electrodes are surrounded by said charge and such that said charge covers at least a part of the molten layer in said furnace, and (c) tapping said furnace to remove a molten chromium containing iron, having a chromium content of about 1–25% by weight, a silicon content of about 0.5–4% by weight, and a carbon content of about 1.5–7% by weight.

The charge to the furnace should be a mixture of chromite, flux materials, ferrous scrap metal, carbonaceous material and wood chips, if desired, in the appropriate amounts. The mixture can be charged to the furnace through ports in the furnace roof or with mechanical charging equipment. Forming the mixture is done in a conventional manner using conventional means. Alternatively, ferrous scrap materials can be partly or wholly charged around the periphery of the furnace and one or more of chromite, flux materials and carbonaceous materials may be partly or wholly charged to the smelting zone in the electrode area. One or more of chromite, flux materials and carbonaceous materials may preferably be partly or wholly charged to the smelting zone in the electrode area through ports in the central part of the roof or through the center of one or more hollow electrodes.

The iron content of the ferrous scrap should be about 70% to about 99% by weight and, more preferably, about 95% by weight of the scrap. The ferrous scrap should preferably be in particulate form, typical of shredded ferrous scrap or turnings that is with a particle size about 1 cm to about 20 cm, but the process can accept scrap up to about 150 cm depending on furnace size and charging equipment. The process can accept Cr or Ni containing ferrous scrap.

The chromite used in the charge should be in a particulate form measuring about 1 mm to about 100 mm and, more preferably, about 10 mm in size. Chromite or other chromium containing materials may be in the form of lumpy ore, ore fines concentrate or agglomerates of ore/concentrate fines such as green or fired pellets, briquettes or sinters. However, particle size outside this range may be accepted subject to particle size of other charge materials. Any conventional source of chromite can be used. Other materials containing chromium compounds may be used to supplement the chromite, eg. dusts and slurries from gas cleaning plants, plating sludges, millscales, and other metallurgical wastes. The amount of chromite that should be used in the charge is about 1% to about 60% by weight of scrap and it has been found that using 45% by weight of scrap of chromite produces an acceptable iron containing 18% Cr. Naturally, the amount of chromite in the charge is adjusted based on the chromium content of the scrap so as to provide a molten metal having chromium content of about 18% by weight.

The flux materials used in the charge should be in a particulate form measuring about 1 mm to about 50 mm and, more preferably, about 10 mm or less in size. However, particle size outside this range may be accepted subject to particle size of other charge materials. The amount of flux that should be used in the charge is about 1% to about 20% by weight of scrap and it has been found that using 5% by weight of scrap of flux materials produces acceptable results. The type of flux used will depend upon the raw materials analysis, particularly the chromite. The flux materials may include quartzite, bauxite, lime and magnesia containing material.

The carbonaceous material used in the present invention is about 5% to about 35% by weight scrap and, more preferably, about 25% or less by weight scrap. Any conventional source of carbonaceous material can be used such as coal or preferably coke, and good results have been obtained using coke. The carbonaceous material preferably has a size of about 1 mm to about 50 mm and good results have been obtained using coke which has a particle size of about 3 mm. The amount of carbonaceous material used in the charge will depend upon the amount of carbon in the scrap, on required carbon and silicon content in the metal and the amount of carbon reporting to the furnace gas.

Wood chips can be added to the charge to control the conductivity and to control solid feed charge flowability properties in the submerged arc furnace. It has been found that wood chips in an amount of 4% based on the weight of scrap in the charge gives satisfactory operation in a small furnace. More specifically, the amount of wood chips used in the charge can be about 10% to 0% by weight of scrap. If wood chips are used, they should have a size of about 30 to about 180 mm and, more preferably, they should have their largest dimension measuring about 75 min.

Wood chips can be partly or fully substituted by other solid organic materials like coconut shells, rice hulls, automobile fluff (mainly plastic material obtained in shredding automobiles), etc. End of life fragmented automobile parts, comprising iron and steel scrap combined with plastics or other organic material components may also be charged to the furnace without prior separation.

FeNi or NiO containing materials can be charged to the submerged arc furnace, the tapping ladle or the AOD vessel if a Ni containing iron or steel is required. The Ni content of the iron produced may be about 1 to about 10% by weight. Typically, about 11% of NiO by weight of scrap could be charged to the submerged arc furnace to produce an iron containing 8% Ni.

In order to control contaminants that are introduced with charged materials into the furnace, one or more methods as outlined herein must be employed. These methods include proper selection and control of raw materials for the furnace, using slag in the furnace and treating the molten metal as it is tapped from the furnace in the ladle or the launder.

Selection and control of the materials used to form the charge to the furnace is done in a conventional manner such as by performing chemical analysis on the materials used to form the charge and determining and controlling their chemical makeup. This is especially well suited for controlling the sulfur and phosphorus content of the molten metal tapped from the furnace. Additionally, a pure source of iron such as direct reduced iron ore, or clean unreduced iron ore can be added to the charge in order to dilute the contaminants thereby producing a molten iron in the furnace with a low level of contaminants.

The use of slag in the furnace to control contaminants is done in a conventional manner. Use of slag in the furnace will help to control the sulfur. Specifically, these contaminants will essentially end up in the slag thereby reducing their concentration in the molten metal. A ferrochrome slag containing 0–20% by weight CaO, 20–40% by weight $SiO_2$, 5–35% by weight MgO, 5–35% by weight $Al_2O_3$ and 0–20% by weight other materials such as $Cr_2O_3$, FeO and MnO may be used. Alternatively, a synthetic slag such as 10–50% by weight CaO, 10–50% by weight $SiO_2$ and 0–20% by weight other materials such as $CaF_2$, $Al_2O_3$, FeO and $Cr_2O_3$ may be used in order to effect desulphurization of the metal.

Removing contaminants from tapped metal in the ladle or launder is done in a conventional manner using conventional means. Specifically, the molten metal as tapped from the furnace can be treated with synthetic slag, magnesium or with calcium carbide to reduce the metal's sulphur content.

The operation of the furnace itself is best understood by reference to the submerged arc furnace as shown in FIG. 1.

As shown in FIG. 1, the electrode or electrodes 10 extend through roof 12 of furnace 14. In a closed sealed furnace configuration, as shown in FIG. 1, charge 16 sits on top, partly submerged in molten layer 18 and molten layer 18 is made up of slag layer 20 and metal layer 22. Charge 16 is added to the furnace through ports 24 which am positioned in the furnace roof 12. In an open furnace configuration the solid charge and molten phase configuration is similar to the closed sealed furnace configurations. However, in the open furnace configuration where the cover is not sealed to the furnace allowing air to be drawn into the furnace, charge is added to the furnace through ports in the furnace cover and/or by mechanical charging equipment. The furnace can be designed and operated in alternating current mode with one or more top electrodes, or in a direct current mode, typically with one top electrode and one bottom contact. Molten metal layer 22 is tapped continuously or intermittently from furnace 14 in a conventional manner using a tap hole not shown in FIG. 1.

Molten slag is tapped from furnace 14 in a conventional manner using a tap hole which is positioned above the metal tap hole. The slag tap hole is also not shown in FIG. 1.

The use of a submerged arc furnace provides a number of benefits to the smelting of ferrous scrap and chromite into molten chromium containing iron. Namely, it provides improved thermal functionality because the heat from the furnace gas is transferred to the standing scrap charge which rests on top or is partly submerged in the molten layer 18 in the furnace, because the scrap protects the side walls and the roof from arc radiation and because the process is continuous rather than the batch operation of conventional arc furnaces. The improved energy efficiency of the method of the present invention compared with conventional arc furnaces applies to preheating and prereduction of solid charge in the furnace, reduced heat losses due to radiation, because furnace side wall and roof are protected from radiation by the solid charge. In addition the in-situ production of ferrochrome instead of adding cold ferrochrome to the metal, further improve the energy efficiency. As will be appreciated by those of skill in the art, the scrap charge can be continuously added to the furnace so as to maintain a high level of charge in the furnace. The benefit of using chromite in the charge is that ferrochrome is produced in-situ and there is no need or a reduced need to add ferrochrome to the metal in order to make the metal suitable as a base for iron or steel production.

By using the submerged arc furnace in accordance with the present invention the electric energy utilization efficiency is expected to be 80–90% in a large industrial scale furnace. The furnace refractory lining life will be increased compared to conventional electric arc furnace because the lining is protected from radiation by scrap standing charge. In order to further reduce electric energy consumption, fossil fuel burners can be located in the furnace sidewalls or roof to preheat the charge. Alternatively, or additionally, an oxygen containing gas can be injected into the charge in order to totally or partially combust any organic matter and CO rich reaction gas for the purpose of preheating the charge and destructing the organic matter. Also, volatile elements such as zinc, lead and cadmium may, in this way be transferred to the gas phase and the contents of these elements thereby are reduced in the metallic phase.

The electrodes used in accordance with the submerged arc furnace of the present invention can be prebaked electrodes or continuous baked Søderberg electrodes. It will be appreciated by those of skill in the art that the use of the Søderberg electrodes will provide substantial cost benefit. It has been found that the high level of charge which runs up the side of the electrode protects the electrode side wall from oxidation.

The metal temperature in the furnace, is subject to composition and end user requirement and should be about 1400° C. to about 1700° C. and, more preferably, about 1500° C. to about 1600° C.

It has been found that by using the submerged arc furnace in accordance with the present invention that a an iron containing about 18% Cr, 5% C and 1% Si can be produced. This metal is suitable for further refining in an AOD converter or similar process reactor to produce steel.

It will be understood that the claims are intended to cover all changes and modifications of the preferred embodiment of the invention herein chosen for the purpose of illustration which do not constitute a departure from the spirit and scope of the invention.

We claim:

1. A method for continuously converting ferrous scrap metal and chromite into a chromium containing iron product the method comprising the steps of:
    (a) feeding to a submerged arc furnace having an electrode positioned therein, a charge comprising;
        (i) about 1–60% by weight of scrap of chromite,
        (ii) about 1–20% by weight of scrap of flux materials;
        (iii) about 5–35% by weight of scrap of carbonaceous material,
        (iv) about 0–20% by weight of scrap of wood chips, and
        (v) a remainder of ferrous scrap metal wherein said scrap metal comprises about 70–99% by weight iron;
    (b) melting said charge in said furnace such that said furnace contains a molten layer and a layer of solid charge above said molten layer, said molten layer comprising a slag layer floating on top of a molten metal layer;
    (c) maintaining a layer of solid charge above said molten layer in said furnace such that said electrode is surrounded by said solid charge and such that said solid charge at least partly covers the molten layer in said furnace; and
    (d) removing from said furnace said molten metal layer to obtain a molten chromium containing iron product having a chromium content of about 1–25% by weight, a silicon content of about 0.5–4% by weight, and a carbon content of about 1.5–7% by weight.

2. The method of claim 1 further comprising the step of charging a Ni containing material to the furnace to provide a Ni-content in said chromium containing iron product of about 1 to 10% by weight.

3. The method of claim 1 wherein thermal energy is generated by arcing between the electrodes and the molten layer.

4. The method of claim 1 wherein sulphur is partly removed from the molten metal layer by means of said slag layer.

5. The method of claim 4 wherein thermal energy is generated by resistance heating between the electrode and the slag layer.

6. The method of claim 1 further comprising the step of treating the molten chromium containing iron product removed from the furnace with either calcium carbide, magnesium or synthetic slag to decrease sulfur and phosphorus in the molten chromium containing iron product.

7. The method of claim 4 further comprises the step of adding synthetic slag to the furnace to produce a slag layer on top of the molten metal layer.

8. The method of claim 1 wherein said carbonaceous material is coke or coal.

9. The method of claim 1 wherein the method employs no wood chips.

10. The method of claim 1 wherein the electrode is a consumable electrode.

11. The method of claim 1, wherein said furnace has a periphery and a smelting zone, the ferrous scrap metal is charged around the periphery of the furnace and the chromite, flux materials and carbonaceous materials are charged into the smelting zone of the furnace.

12. The method of claim 11 wherein said electrode has a hollow center and at least one of the components of said charge is feed into the smelting zone of the furnace through the center of the electrode.

13. The method of claim 1 wherein the impurities in the chromite, carbonaceous materials and the flux materials are low.

14. The method of claim 1 further comprising the step of adding direct reduced iron ore to the furnace to reduce impurities in the charge.

15. The method of claim 1 wherein the wood chips have been at least partially replaced with a solid organic material for controlling conductivity and flowability properties of said charge in the submerged arc furnace.

16. The method of claim 15 wherein the solid organic material is selected from the group consisting of coconut shells, rice hulls, and automobile fluff.

17. The method of claim 15 wherein the solid organic material is selected from the group consisting of fragmented crushed and compacted automobiles consisting of combined steel and organic matters.

18. The method of claim 1 wherein the charge in the furnace is preheated by means of fossil fuel burners located in the furnace side walls or roof.

19. The method of claim 1 wherein an oxygen containing gas is injected into the charge in the furnace in order to combust organic matter, CO and $H_2$ rich reaction gas in order to preheat the charge and to destruct any organic matter.

* * * * *

UNITED STATES PATENT AND TRADEMARK OFFICE
CERTIFICATE OF CORRECTION

PATENT NO. : 5,654,976
DATED : August 5, 1997
INVENTOR(S) : Peter Cowx et al.

It is certified that error appears in the above-identified patent and that said Letters Patent is hereby corrected as shown below:

Column 1, line 49, change "am" to --arc--.
Column 3, line 36, change "min" to --mm--.
Column 4, line 25, change "am" to --are--.

Signed and Sealed this

Thirteenth Day of January, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,654,976
DATED : August 5, 1997
INVENTOR(S) : Peter Cowx et al.

It is certified that error appears in the above-indentified patent and that said Letters Patent is hereby corrected as shown below:

Column 3, line 24, after "on" insert --the--.

Column 4, line 54, change "furnace," to --furnace and--; line 55, before "furnace" insert --the--; line 57, after "metal" delete ","; line 58, change "improve" to --improves--.

Column 5, line 3, change "furnace" to --furnaces--; line 11, change "destructing" to --destroying--; line 12, after "may" delete ","; line 22, after "furnace" delete ","; line 23, change "requirement" to --requirements--; line 27, after "that" delete "a".

Column 6, line 3, (claim 2), change "Ni-content" to --Ni content--; line 20 (claim 7), change "comprises" to --comprising--; line 21 (claim 7), change "a" to --said--; line 37 (claim 12), change "feed" to --fed--; line 62 (claim 19), change "destruct" to --destroy--.

Signed and Sealed this

Tenth Day of March, 1998

Attest:

BRUCE LEHMAN

*Attesting Officer*      *Commissioner of Patents and Trademarks*